Oct. 21, 1924.  
H. A. HOKE  
1,512,093  
CROSSHEAD PIN  
Filed Oct. 27, 1919  
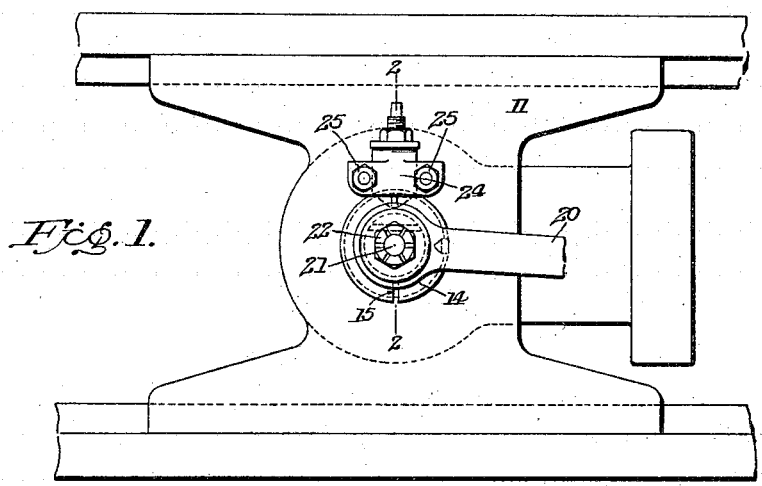
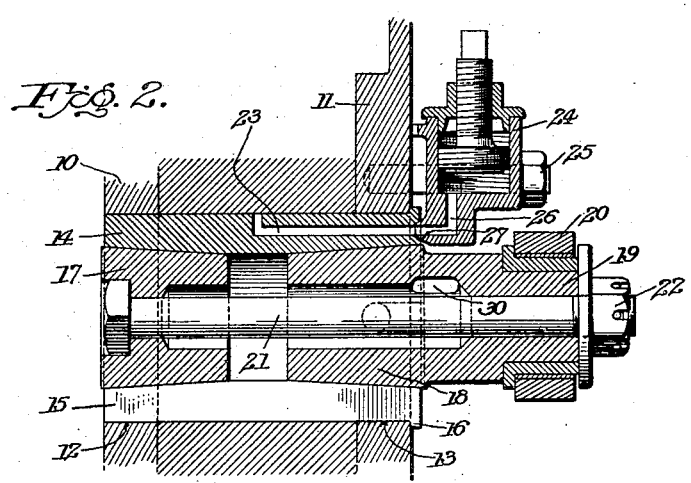
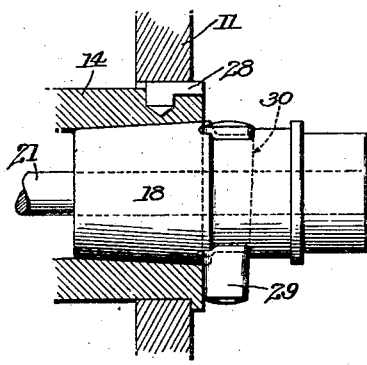
Inventor  
H. A. Hoke,  
By Foster, Freeman, Watson & Coit,  
Attorneys Patented Oct. 21, 1924.

1,512,093

UNITED STATES PATENT OFFICE.

HARRY A. HOKE, OF ALTOONA, PENNSYLVANIA.

CROSSHEAD PIN.

Application filed October 27, 1919. Serial No. 333,716.

*To all whom it may concern:*

Be it known that I, HARRY A. HOKE, a citizen of the United States, and residing at Altoona, Blair County, State of Pennsylvania, have invented certain new and useful Improvements in Crosshead Pins, of which the following is a specification.

The present invention relates to engines and more particularly to a crosshead pin construction.

With the type of crosshead pin now employed it is very difficult, if not impossible, to obtain equally tight fits in both walls of the crosshead. This is due to imperfections in the tools used in making the parts, the difference in the hardness of the material, and a slight spring between the inner and outer walls of the crosshead.

It is the principal object of the present invention to provide a crosshead pin construction which may be fitted in both walls of the crosshead with equal tightness although there may be slight variations in the diameters of the openings in the crosshead. Other objects and features of novelty will be apparent from the description taken in connection with the drawings in which:

Figure 1 is a side elevation of a crosshead having a wrist pin constructed in accordance with the present invention;

Figure 2 is a sectional elevation taken substantially on the line 2—2 of Figure 1; and Figure 3 is a detail illustrating the manner of loosening one of the wedge members.

Referring to the drawings it will be seen that the crosshead has the inner and outer walls 10 and 11 formed with the aligned openings 12 and 13 respectively for the wrist pin. The wrist pin construction comprises a sleeve 14 which is split longitudinally as at 15. In the form shown the sleeve is provided with a radial flange 16 at its outer end adapted to engage the outside surface of the outer wall 11 and thus limit the inward movement of the pin. According to the present invention the sleeve or hollow pin 14 is adapted to be expanded to an equally tight fit in both of the openings 12 and 13. To this end means is provided within the sleeve for expanding the same. As shown the bore of the sleeve at its opposite ends is tapered inwardly and a pair of conical wedge members 17 and 18 are disposed in these tapers. The member 18 has a portion 19 projecting from the front side of the crosshead and a valve gear operating member 20 is mounted on this portion 19. For the purpose of effecting relative movement between the wedge members 17 and 18, to expand the sleeve, a bolt 21 extends through the two members and has a nut 22 at the front or outside of the crosshead by means of which the members 17 and 18 are forced toward each other and the sleeve expanded.

For the purpose of lubricating the pin bearing the sleeve is formed with a passage 23 leading from its outer end to a point midway of the length of its cylindrical surface. A lubricant cup 24 is secured to the outer wall of the crosshead as by means of the studs 25 and its outlet passage 26 registers with the passage 23 in the pin. In the form shown the lubricant cup is provided with a conical nipple 27 which engages a corresponding seat formed at the end of the passage 23. It will be seen that the cup therefore holds the pin against movement in an outward direction. In order to secure the pin against rotation a key 28, such as shown in Figure 3, is provided.

In order to remove the wrist pin from the crosshead the lubricant cup 24 is first taken off. Then the nut 22 is screwed off the bolt 21 and a key member, such as 29, driven into the transverse opening 30 in the wedge member 18. This opening 30 is disposed so that when the key is driven into the same it loosens up the member 18 from the sleeve 14. After the wedge member 18 has been removed the opposite member 17 may be driven out in any suitable manner as by means of hammering on a stick or other member inserted inside the wrist pin and engaging the member 17. After the member 17 is loosened the pin, together with said member and the bolt 21, may be withdrawn outwardly from the crosshead. The manner of assembling the pin in the crosshead is thought to be obvious. It is to be observed, however, that the wrist pin construction may be inserted from the outside of the crosshead so that it is not necessary to have the driving wheel of the locomotive positioned so that the pin may be inserted between spokes.

Although a specific embodiment of the invention has been described in detail it is to be understood that the invention is not thus limited but includes modifications and changes which come within the scope of the appended claims.

Having thus described the invention what is claimed as new and desired to be secured by Letters Patent is:

1. The combination with a crosshead having aligned openings in its opposite walls, a hollow split pin disposed in said openings having a radial flange to prevent longitudinal movement in one direction, means to hold the pin against movement in the other direction, and means to expand the pin to an equally tight fit in both openings.

2. The combination with a crosshead having aligned openings in its opposite walls, a hollow split pin disposed in said openings having a radial flange to prevent longitudinal movement in one direction, a lubricating cup secured to the crosshead and engaging the pin to hold it against movement in the other direction, and means to expand the pin to a tight fit in said openings.

3. The combination with a locomotive crosshead having aligned openings in its opposite walls, a hollow split pin disposed in said openings and having a flange on its outer end to hold the pin against inward movement, means engaging the outside end of the pin to hold it against outward movement, and means to expand the pin to an equally tight fit in both openings.

4. The combination with a locomotive crosshead having aligned openings in its opposite walls, a pin in said openings having a radial flange engaging a wall of the crosshead to hold the pin against longitudinal movement in one direction, and a lubricator removably secured to the crosshead engaging one end of the pin to hold it against movement in the other direction.

5. As an article of manufacture, a crosshead pin comprising a longitudinally split sleeve, a pair of oppositely disposed conical wedge members within the sleeve the interior surface of which is adapted to receive said members, and means extending through said members to move them relatively in the direction to expand the sleeve, one of said members extending axially from the pin and having a cylindrical bearing surface adjacent its outer end.

6. The combination with an engine crosshead having aligned openings in its opposite walls, of a pin construction disposed in said openings including a longitudinally split sleeve, oppositely disposed expanding members within said sleeve, means to actuate said members to expand the sleeve to an equally tight fit in both openings, and one of said members projecting axially from the sleeve and having a cylindrical bearing surface thereon.

7. The combination with an engine crosshead having aligned openings in its opposite walls, of a pin construction disposed in said openings including a longitudinally split sleeve, oppositely disposed expanding members within said sleeve, means to actuate said members to expand the sleeve to an equally tight fit in both openings, and one of said members having a valve gear operating member connected thereto.

In testimony whereof I affix my signature.

HARRY A. HOKE.